(12) United States Patent
Abercrombie et al.

(10) Patent No.: US 7,454,387 B2
(45) Date of Patent: Nov. 18, 2008

(54) METHOD OF ISOLATING SOURCES OF VARIANCE IN PARAMETRIC DATA

(75) Inventors: David Abercrombie, Gresham, OR (US); Thaddeus T. Shannon, III, Portland, OR (US); James McNames, Portland, OR (US)

(73) Assignee: LSI Corporation, Milpitas, CA (US)

( * ) Notice: Subject to any disclaimer, the term of this patent is extended or adjusted under 35 U.S.C. 154(b) by 1020 days.

(21) Appl. No.: 10/663,218

(22) Filed: Sep. 15, 2003

(65) Prior Publication Data

US 2005/0060336 A1      Mar. 17, 2005

(51) Int. Cl.
*G06E 1/00* (2006.01)
*G06F 15/18* (2006.01)
(52) U.S. Cl. ........................................... 706/20
(58) Field of Classification Search ................ 706/12, 706/14, 15; 707/102
See application file for complete search history.

(56) References Cited

U.S. PATENT DOCUMENTS

| | | | |
|---|---|---|---|
| 5,859,964 A * | 1/1999 | Wang et al. ................ 714/48 |
| 5,963,881 A | 10/1999 | Kahn et al. | |
| 6,243,615 B1 | 6/2001 | Neway et al. | |
| 6,356,861 B1 * | 3/2002 | Singhal et al. ................ 703/2 |
| 6,389,366 B1 * | 5/2002 | Heavlin ..................... 702/84 |
| 6,477,685 B1 | 11/2002 | Lovelace | |
| 6,662,070 B1 | 12/2003 | Conboy et al. | |
| 6,735,492 B2 | 5/2004 | Conrad et al. | |
| 2003/0223055 A1 * | 12/2003 | Agarwal et al. ............ 356/72 |

OTHER PUBLICATIONS

Vigario, Ricardo et al.; Independent Component Analysis for Identification of Artifacts in Magnetoencephalographic Recordings; Lab. of Computer & Info. Science, Brain Research Unit, Low Temp. Lab. Helsinki University of Technology, Finland; Denver, Dec. 1997; pp. 1-7.
Vigario, Ricardo et al.; Independent Component Approach to the Analysis of EEG and MEG Recordings; IEEE Transactions on Biomedical Engineering, vol. 47, No. 5, May 2000; pp. 589-593.
Hyvarien, Aapo; Fast and Robust Fixed-Point Algorithms for Independent Component Analysis; Helsinki University of Technology, Pav. Of Computer & Info. Science; Finland, Apr. 23, 1999; pp. 1-17.
Hyvarien, Aapo et al; Emergence of Phase and Shift Invariant Features by Decomposition of Natural Images Into Independent Feature Subspaces; Helsinki University of Technology, Lav. Of Computer & Info. Science; Finland, Aug. 16, 1999; pp. 1-15.

* cited by examiner

*Primary Examiner*—David Vincent
*Assistant Examiner*—Kalpana Bharadwaj
(74) *Attorney, Agent, or Firm*—Eric James Whitesell

(57) ABSTRACT

A method of isolating sources of variance in parametric data includes steps of: (a) cleaning a data set of measurements for a plurality of parameters; (b) generating a principal component analysis basis from the cleaned data set; (c) estimating an independent component analysis model from the principal component analysis basis; (d) calculating percentages of variance for the plurality of parameters explained by each component in the estimated independent component analysis model; (e) if the calculated percentages of variance indicate that a component is a minor component, then transferring control to step (f), else transferring control to step (g); (f) removing the minor component from the principal component analysis basis and transferring control to step (c); and (g) generating as output the estimated independent component analysis model wherein no component of the independent component analysis model is a minor component.

14 Claims, 2 Drawing Sheets

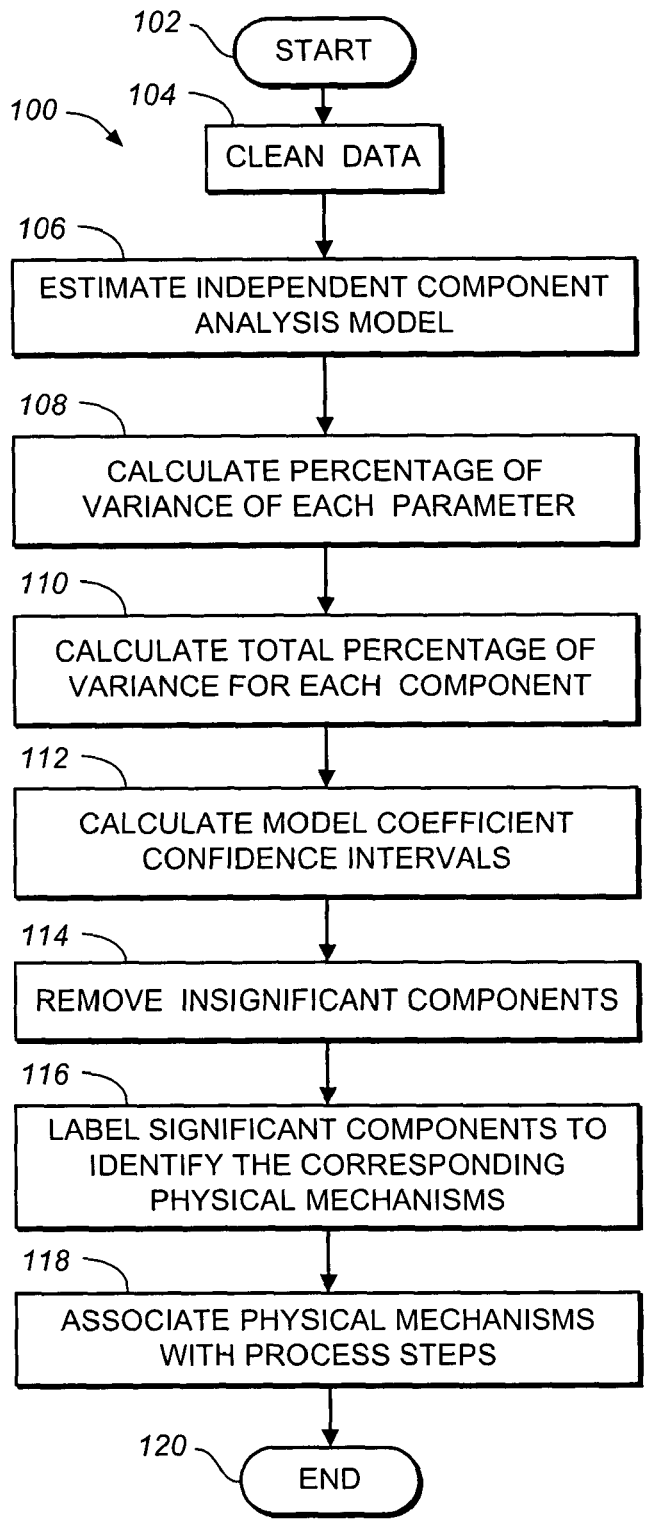
FIG._1

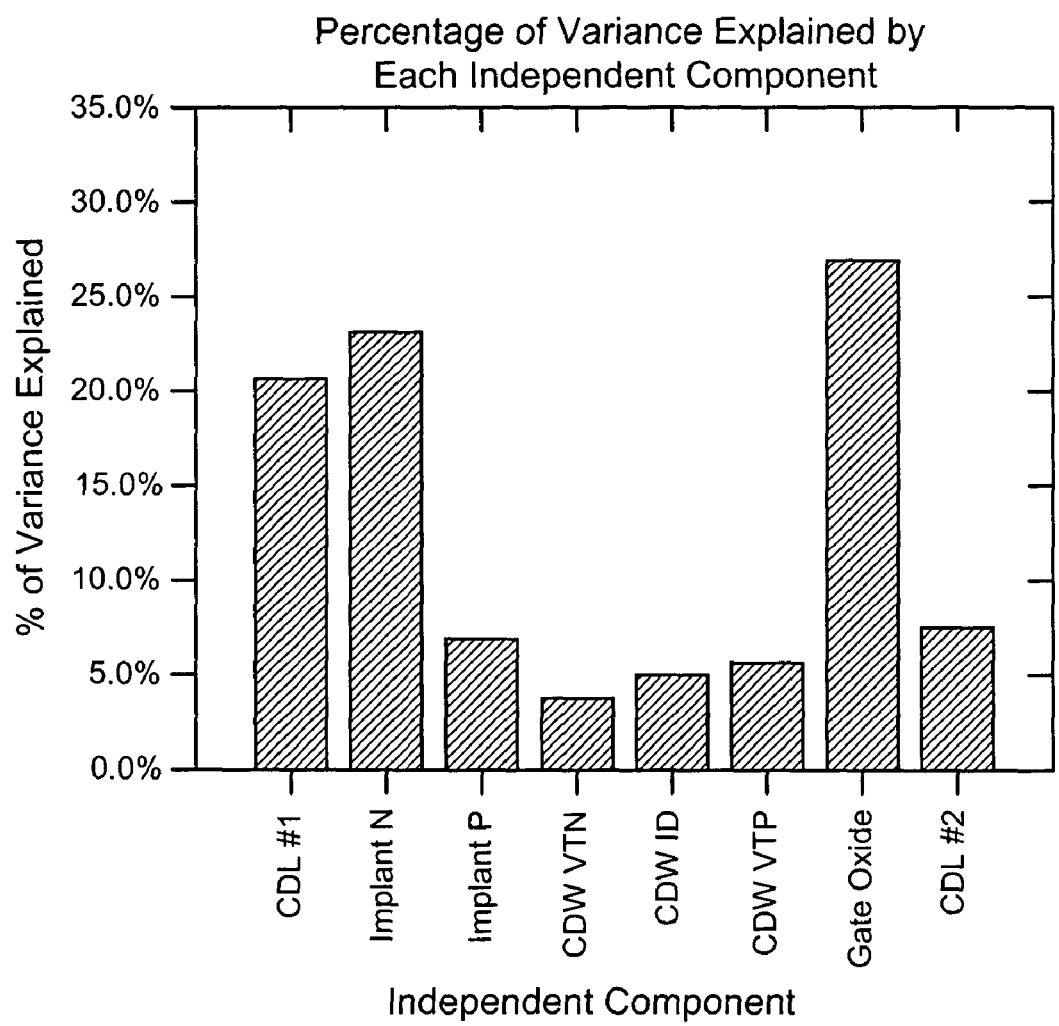
FIG._2

METHOD OF ISOLATING SOURCES OF VARIANCE IN PARAMETRIC DATA

BACKGROUND OF THE INVENTION

1. Field of the Invention

The present invention relates to testing of integrated circuit devices. More specifically, but without limitation thereto, the present invention relates to a method of isolating sources of variance in parametric test data measured from a semiconductor wafer used in the manufacture of integrated circuits.

2. Description of Related Art

Semiconductor devices are typically manufactured in several processing steps. Each of these processing steps contributes variability to the performance and robustness of the resulting products. Microelectronic parametric test (E-test) structures are frequently incorporated into production wafers to monitor specific physical phenomena during the processing steps. Although the E-test structures are designed to isolate specific physical phenomena, in practice there is usually a high degree of correlation among test parameters due to the influence of multiple variance mechanisms commonly found in any E-test structure. The high degree of correlation among test parameters limits the capability to diagnose production process variation using conventional E-test and lot-equipment-history (LEH) data. As a result, traditional statistical analysis methods, such as principal component analysis (PCA), are unable to isolate sources of variance in the test data to identify the underlying physical mechanisms, for example, in the processing steps used to manufacture integrated circuits.

SUMMARY OF THE INVENTION

The present invention provides a method of isolating sources of variance in parametric data to facilitate identifying the physical mechanisms underlying the sources of variance in the manufacture of integrated circuits for improved manufacturing process control, increased wafer yield, and increased product reliability. Although the examples described below are directed specifically to semiconductor manufacturing processes, other manufacturing processes may benefit from various embodiments of the present invention practiced within the scope of the appended claims.

In one aspect of the present invention, a method of isolating sources of variance in parametric data includes steps of:
 (a) cleaning a data set of measurements for a plurality of parameters;
 (b) generating a principal component analysis basis from the cleaned data set;
 (c) estimating an independent component analysis model from the principal component analysis basis;
 (d) calculating percentages of variance for the plurality of parameters explained by each component in the estimated independent component analysis model;
 (e) if the calculated percentages of variance indicate that a component is a minor component, then transferring control to step (f), else transferring control to step (g);
 (f) removing the minor component from the principal component analysis basis and transferring control to step (c); and
 (g) generating as output the estimated independent component analysis model wherein no component of the independent component analysis model is a minor component.

In another aspect of the present invention, a computer program product for isolating sources of variance in parametric data includes a medium for embodying a computer program for input to a computer and a computer program embodied in the medium for causing the computer to perform steps of:
 (a) cleaning a data set of measurements for a plurality of parameters;
 (b) generating a principal component analysis basis from the cleaned data set;
 (c) estimating an independent component analysis model from the principal component analysis basis;
 (d) calculating percentages of variance for the plurality of parameters explained by each component in the estimated independent component analysis model;
 (e) if the calculated percentages of variance indicate that a component is a minor component, then transferring control to step (f), else transferring control to step (g);
 (f) removing the minor component from the principal component analysis basis and transferring control to step (c); and
 (g) generating as output the estimated independent component analysis model wherein no component of the independent component analysis model is a minor component.

BRIEF DESCRIPTION OF THE DRAWINGS

The present invention is illustrated by way of example and not limitation in the accompanying figures, in which like references indicate similar elements throughout the several views of the drawings, and in which:

FIG. 1 illustrates a flow chart of a method of isolating sources of variance in semiconductor E-test data according to an embodiment of the present invention; and FIG. 2 illustrates a bar graph of the average percentage of variance accounted for by each significant component in the resulting independent component analysis model according to an embodiment of the present invention.

Elements in the figures are illustrated for simplicity and clarity and have not necessarily been drawn to scale. For example, the dimensions of some elements in the figures may be exaggerated relative to other elements to point out distinctive features in the illustrated embodiments of the present invention.

DESCRIPTION OF THE ILLUSTRATED EMBODIMENTS

Sources of variance in E-test data may be found in individual process steps used in the manufacture of integrated circuits. These sources of variance include physical phenomena such as effective gate length, gate oxide thickness, and channel implantation. Isolating sources of variance that are as statistically independent as possible facilitates the construction of a general model of how the manufacturing process generates variability in the observed E-test parameters.

Independent component analysis (ICA) is a recently developed statistical method that finds the orthogonal transformation of observed variables that maximizes the statistical independence of the transformed variables. Two random variables are said to be independent when their joint density may be factored, that is, their joint density is the product of their separate univariate densities. Variable independence implies that knowledge of the value of one variable for a specific trial imparts no information concerning the value of the other variable for that trial. Independent component analysis attempts to find a linear transformation of the principal component analysis (PCA) basis that minimizes mutual information among the output variables generated from the linear transformation.

The present invention advantageously applies independent component analysis to model semiconductor parameter variability, the calculation of confidence intervals for independent component analysis coefficients, and the calculation of variance accounted for by estimated sources from the independent component analysis. The term "independent component analysis" is used herein to refer to any of the recently developed methods for blind source separation (BSS), blind deconvolution, or blind channel equalization based on estimating parametric transformations of observed data that minimize mutual information, or related information theoretic quantities, for example, maximizing negentropy or log-likelihood between the transformed sources. These methods include, but are not limited to, a full range of linear and nonlinear techniques.

In one aspect of the present invention, a method of isolating sources of variance in parametric data includes steps of:
 (a) cleaning a data set of measurements for a plurality of parameters;
 (b) generating a principal component analysis basis from the cleaned data set;
 (c) estimating an independent component analysis model from the principal component analysis basis;
 (d) calculating percentages of variance for the plurality of parameters explained by each component in the estimated independent component analysis model;
 (e) if the calculated percentages of variance indicate that a component is a minor component, then transferring control to step (f), else transferring control to step (g);
 (f) removing the minor component from the principal component analysis basis and transferring control to step (c); and
 (g) generating as output the estimated independent component analysis model wherein no component of the independent component analysis model is a minor component.

In one embodiment of the present invention, the sources of variance in E-test data to be isolated represent fundamental physical phenomena including effective gate length, gate oxide thickness, and channel implant. The physical phenomena may be linked directly to individual process steps to formulate a general model of how the manufacturing process generates variability in the observed E-test parameters.

In the following example, models were estimated of 0.25 micron CMOS transistor test structures embedded in the scribe lines of 8-inch wafers from a raw data set of more than 10,000 test sites in 230 production lots of a single application-specific integrated circuit (ASIC). The data set represented both high and low yield over a two-month period at a single fabrication facility. In general, data was sampled from about 20 percent of the wafers in a lot, however, some lots were under or over represented in the sampling.

At each test site, 107 test parameters were available, of which the following eight n-channel and eight p-channel measurements were selected:
 (1) lateral diffusion (NLD, PLD);
 (2) saturation current, long-wide channel (IDN LW, IDP LW);
 (3) saturation current, short-wide channel (IDN SW, IDP SW);
 (4) saturation current, short-narrow channel (IDN SN, IDP SN);
 (5) threshold voltage, long-wide channel (VTN LW, VTP LW);
 (6) threshold voltage, short-wide channel (VTN SW, VTP SW);
 (7) threshold voltage, short-narrow channel (VTN SN, VTP SN); and
 (8) gate oxide thickness (TOX PW, TOX NW).

Based on general knowledge of device physics and an understanding of the test structures and the tests being performed, these eight n-channel and eight p-channel parameters were selected from the 107 available parameters as an example of parameters created to help isolate sources of variance in parametric data underlying certain physical phenomena associated with the semiconductor processing. By first principles, these parameters should reflect the physical influences of at least (1) gate length critical dimension, (2) gate oxide thickness, (3) threshold voltage implantation, and (4) gate width critical dimension. The test structures and tests associated with these parameters represent an attempt to isolate the influences of these physical phenomena, however, most of the parameters are influenced by more than one of the physical phenomena at the same time. The objective in this example was to determine whether independent component analysis without any foreknowledge would isolate similar physical phenomena better than the selected input parameters. Also, because the physical to electrical relationship of the selected input parameters is fairly well understood by first principles, the interpretation of the results of the independent component analysis may be more easily inferred as related to the input parameters.

FIG. 1 illustrates a flow chart 100 of a method of isolating sources of variance in semiconductor E-test data according to an embodiment of the present invention.

Step 102 is the entry point of the flow chart 100.

(1) Clean Data

In step 104, the raw data is "cleaned" by omitting test sites containing extreme outliers or one or more test measurements out of range. This step avoids errors that may be introduced, for example, due to tester malfunction. In this example, less than one percent of the E-test site data was omitted. The data for each parameter is then normalized to zero mean by subtracting out the sample mean from each sample. Each parameter is normalized to unit variance by dividing each sample by the estimated standard deviation of the parameter. When principal component analysis (PCA) was applied to the cleaned data, over 95 percent of the variance for either the n-channel or the p-channel data was accounted for by four components. However, when considering which components account for which parameters, the principal components were found to be as uninformative as they are efficient in accounting for the variance in the parametric data.

(2) Estimate Independent Component Analysis Model

In step 106, separate n-channel, p-channel, and combined channel independent component analysis models are estimated using appropriate robust estimators of independence. This may be accomplished by first performing principal component analysis (PCA) to sphere the data, then applying an independent component analysis algorithm according to well-known techniques, for example, the Fast ICA algorithm by Hyvarinen, "Fast and Robust Fixed-Point Algorithms for Independent Component Analysis", IEEE Transactions on Neural Networks, Vol. 10, No. 3, pp. 626-634, 1999 with hyperbolic tangent and skewness contrast functions to find the maximally independent rotation of the PCA basis as follows:
 (1) Select an initial component direction b;
 (2) Let $b^+ = E\{xF(b^T x)\} - E\{F'((b^T x)\}b$;
 (3) Let $b = b^+/\|b^+\|$;
 (4) Repeat steps 2 and 3 until b does not change, where $E\{f(y)\}$ is the expectation of the function f with respect to the distribution of the random variable y, x denotes the observed parameters in vector form, F is a contrast function, and F' is the derivative of F with respect to the random variable y.

(3) Calculate Percentage of Parameter Variance Explained by Each Independent Component It is informative to examine the percentage of variance of each test parameter accounted for by each estimated independent source. This is possible even though the variance of the sources may not be estimated, because the percentage of variance accounted for is the product of the variance source and the model together and is therefore unambiguous.

In step 108, the explanation of parameter variance by each of the estimated independent components from step 106, that is, the variance of the original centered, normalized observations that lies in each independent component analysis basis vector subspace, is calculated by dividing the respective model row parameters by the standard deviation of the corresponding component. The percentage of variance of each parameter is then equal to the square of the corresponding model coefficient.

(4) Remove Insignificant Components

In step 110, each of estimated independent components, in this example, IC1N, IC2N, IC3N, IC4N, IC5N, IC1P, IC2P, IC3P, IC4P, IC5P, IC1C, IC2C, IC3C, IC4C, IC5C, IC6C, IC7C, IC8C, IC9C, IC10C, IC11C, IC12C, IC13C, IC14C, IC15C, and IC16C, is examined to determine whether the independent component explains a significant amount of variance. If an independent component explains at least a selected minimum percentage of variance in a single parameter or a selected minimum average percentage of variance in all the parameters, then the independent component is determined to be significant. In this example, the selected minimum percentage of variance in a single parameter is 10 percent, and the selected minimum average percentage of variance in all the parameters is 5 percent. The minor components, that is, the basis vectors containing the least variance, represent a minimal amount of variance in the parameters. The insignificant percentages of variance are shown in normal type in Tables 1 and 2 below. A few significant, statistically independent components explain the higher percentages of variance in the observed test parameters. The significant percentages of variance are shown in bold type in Tables 1 and 2 below.

Table 1 below illustrates percentages of variance explained by the initial eight-component n-channel ICA model. The significant values are expressed in bold. Components IC2N, IC3N, and IC6N are significant because they each explain more than 5 percent of the total variance listed in the AVG row at the bottom of Table 1. Components IC7N, and IC8N are significant because they each explain more than 10 percent of the total variance of one of the parameters, that is, IC7N explains VTNSN and IC8N explains IDNSN.

If any of the estimated independent components does not explain the selected minimum percentage of variance for each parameter and also does not explain the selected minimum average percentage of variance for all the parameters, then that independent component is determined to be insignificant.

In step 112, if at least one component has been identified as insignificant, the minor component having the least variance is removed from the principal component analysis basis, reducing the model dimension prior to re-estimating the independent component analysis model. Using principal component analysis for dimension reduction advantageously maximizes the amount of variation retained in the reduced dimension model. If any components were removed from the basis of the principal component analysis, then control is transferred to step 106 to re-estimate the independent component analysis model from the reduced dimension model. Steps 106 through 112 are repeated until all the components in the estimated independent component model are determined to be significant.

Table 2 below illustrates percentages of variance explained by the n-channel ICA model after removing the insignificant component from the eight-component ICA model. In Table 2, the component IC4 is insignificant because none of the parameters has the minimum percentage of variance for a single variable and the average percentage of variance explained by the component IC4 is less than the minimum average percentage of variance.

TABLE 2

|  | IC1 | IC2 | IC3 | IC4 | IC5 | IC6 | IC7 | TOTAL |
| --- | --- | --- | --- | --- | --- | --- | --- | --- |
| NLD | 0.89 | 1.41 | 5.92 | 3.26 | 0.06 | 1.95 | 86.49 | 99.98 |
| IDNLW | 84.98 | 0.02 | 14.17 | 0.00 | 0.00 | 0.12 | 0.37 | 99.66 |
| IDNSW | 44.94 | 0.59 | 17.74 | 1.99 | 0.04 | 0.96 | 33.57 | 99.83 |
| IDNSN | 29.12 | 18.12 | 12.62 | 1.36 | 2.73 | 5.23 | 30.82 | 100.00 |
| VTNLW | 94.60 | 0.01 | 3.40 | 0.36 | 0.01 | 0.05 | 1.33 | 99.76 |
| VTNSW | 54.20 | 0.00 | 2.15 | 1.85 | 0.09 | 0.01 | 41.59 | 99.89 |
| VTNSN | 38.40 | 1.05 | 1.77 | 1.30 | 23.25 | 0.26 | 33.95 | 99.98 |
| TOX | 2.05 | 0.02 | 92.88 | 0.17 | 0.28 | 2.88 | 1.71 | 99.99 |
| AVG | 43.65 | 2.65 | 18.83 | 1.29 | 3.31 | 1.43 | 28.73 | 99.89 |

Table 3 below illustrates percentages of variance explained by the final five-component n-channel ICA model in which every component is significant according to the criteria defined above.

TABLE 3

|  | IC1 | IC2 | IC3 | IC4 | IC5 | TOTAL |
| --- | --- | --- | --- | --- | --- | --- |
| NLD | 0.85 | 0.95 | 88.88 | 2.78 | 5.17 | 98.63 |
| IDNLW | 84.74 | 0.00 | 0.42 | 0.01 | 13.70 | 98.87 |
| IDNSW | 46.84 | 0.01 | 33.86 | 0.23 | 17.01 | 97.95 |
| IDNSN | 30.65 | 22.88 | 34.52 | 1.90 | 9.98 | 99.93 |

TABLE 1

|  | IC1 | IC2 | IC3 | IC4 | IC5 | IC6 | IC7 | IC8 | TOTAL |
| --- | --- | --- | --- | --- | --- | --- | --- | --- | --- |
| NLD | 5.27 | 78.94 | 0.85 | 0.02 | 7.23 | 5.77 | 0.01 | 1.91 | 100.00 |
| IDNLW | 0.31 | 0.31 | 84.80 | 0.00 | 0.03 | 14.44 | 0.05 | 0.06 | 100.00 |
| IDNSW | 2.31 | 27.73 | 44.96 | 5.90 | 0.85 | 17.40 | 0.00 | 0.83 | 99.98 |
| IDNSN | 2.22 | 31.18 | 29.89 | 3.45 | 0.07 | 11.88 | 3.87 | 17.43 | 99.99 |
| VTNLW | 0.02 | 0.74 | 94.48 | 0.00 | 1.34 | 3.40 | 0.00 | 0.01 | 99.99 |
| VTNSW | 0.11 | 38.15 | 54.89 | 4.05 | 0.30 | 2.26 | 0.03 | 0.22 | 100.01 |
| VTNSN | 0.08 | 30.91 | 38.20 | 3.73 | 0.44 | 1.66 | 24.71 | 0.25 | 99.98 |
| TOX | 1.46 | 1.12 | 1.98 | 0.71 | 0.66 | 93.58 | 0.29 | 0.20 | 100.00 |
| AVG | 1.47 | 26.14 | 43.76 | 2.23 | 1.37 | 18.80 | 3.62 | 2.61 | 99.99 |

TABLE 3-continued

|  | IC1 | IC2 | IC3 | IC4 | IC5 | TOTAL |
|---|---|---|---|---|---|---|
| VTNLW | 93.73 | 0.09 | 1.07 | 0.00 | 3.52 | 98.41 |
| VTNSW | 38.47 | 0.00 | 38.76 | 0.15 | 2.32 | 97.54 |
| VTNSN | 38.4 | 0.84 | 39.41 | 19.99 | 1.25 | 99.96 |
| TOX | 1.98 | 0.05 | 1.56 | 0.83 | 95.42 | 99.84 |
| AVG | 44.20 | 3.10 | 29.81 | 3.24 | 18.55 | 98.89 |

(5) Calculate Confidence Intervals

In step 114, confidence intervals are calculated for the rotation angles of the independent component analysis model in which all the components are determined to be significant, called the base model. The calculation may be performed according to well-known techniques, for example, by resampling the independent components of the base model to create a number of surrogate resampled data sets; estimating a new independent component analysis model for each resampled data set; finding the rotation angles, that is, displacement angles, from the base model for each new independent component analysis model; and calculating a desired confidence interval from the empirical distribution of the displacement angles. In the illustrated example, the desired confidence interval is 98 percent.

The basic resampling method is suggested in a different context by Meinecke et al. in "A Resampling Approach to Estimate the Stability of One-dimensional or Multi-dimensional Independent Components", IEEE Transactions on Biomedical Engineering, Vol. 9, No. 12, pp. 1514-1525, 2002. The bootstrap resampling of the independent components may be performed from data observed from m wafer lots included in the original data population as follows:

(1) randomly select one wafer lot from the m wafer lots with uniform, that is, equal probability;

(2) add all the independent component values associated with the selected wafer lot to the corresponding surrogate resampled data set;

(3) repeat steps (1) and (2) until observations from m wafer lots have been added to the corresponding surrogate resampled data set.

The resampling process described above is known as resampling with replacement. For statistical reasons, specifically, independence of observations, it is critical that the resampling be performed at the lot level, because observations made from the same wafer or from two wafers in the same lot will not be independent. The independent component values are resampled instead of the original observations for computational advantage, specifically, the independent component values are already whitened and reduced in dimension. For additional computational advantage, the natural gradient algorithm (NGA) may be used in place of Fast independent component analysis, again with robust contrast functions, according to:

$$W = W + \eta((W^T)^{-1} + E\{F(Wx)x^T\})W^TW,$$
$$= W + \eta(I + E\{F(Wx)x^TW^T\})W$$

where $E\{f(y)\}$ is the expectation of the function f with respect to the distribution of the random variable y, x denotes the observed parameters in vector form, F is a contrast function, W denotes the inverse of the mixing matrix, I is the identity matrix having the same dimension as W, and $\eta$ is a step size parameter. The NGA method is advantageous because it finds the rotation angle in a smooth, incremental manner, so that components do not change order or reverse direction as they can during Fast independent component analysis. The rotation angles are found by taking the matrix logarithm of the final model matrix for each resampled data set.

Table 4 below illustrates the angular 98 percent confidence interval matrix in degrees of the initial eight-component n-channel ICA model. Two or more components are said to interact if the confidence interval between them exceeds 90 degrees. In this example, components IC3 and IC5 strongly interact with or overlap each other.

TABLE 4

|  | IC1 | IC2 | IC3 | IC4 | IC5 | IC6 | IC7 | IC8 |
|---|---|---|---|---|---|---|---|---|
| IC1 | 0.00 | 6.13 | 2.49 | 8.57 | 21.18 | 4.78 | 7.80 | 13.93 |
| IC2 | 6.13 | 0.00 | 19.42 | 20.33 | 13.41 | 23.82 | 13.64 | 8.13 |
| IC3 | 2.49 | 19.42 | 0.00 | 22.65 | 113.21 | 1.76 | 5.43 | 2.35 |
| IC4 | 8.57 | 20.33 | 22.65 | 0.00 | 42.89 | 5.87 | 26.37 | 37.90 |
| IC5 | 21.18 | 13.41 | 113.21 | 42.89 | 0.00 | 8.57 | 64.33 | 53.83 |
| IC6 | 4.78 | 23.82 | 1.76 | 5.87 | 8.57 | 0.00 | 6.95 | 3.23 |
| IC7 | 7.80 | 13.64 | 5.43 | 26.37 | 64.33 | 6.95 | 0.00 | 3.58 |
| IC8 | 13.93 | 8.13 | 2.35 | 37.90 | 53.83 | 3.23 | 3.58 | 0.00 |

Table 5 below illustrates the angular 98 percent confidence interval matrix in degrees of the final reduced n-channel ICA model. As may be appreciated from Table 5, all of the independent components are isolated, that is, none strongly interact with or overlap another.

TABLE 5

|  | IC1 | IC2 | IC3 | IC4 | IC5 |
|---|---|---|---|---|---|
| IC1 | 0.00 | 0.15 | 1.00 | 0.15 | 0.44 |
| IC2 | 0.15 | 0.00 | 6.04 | 3.73 | 0.91 |
| IC3 | 1.00 | 6.04 | 0.00 | 14.52 | 3.76 |
| IC4 | 0.15 | 3.73 | 14.52 | 0.00 | 0.70 |
| IC5 | 0.44 | 0.91 | 3.76 | 0.70 | 0.00 |

(6) Label Components to Correspond to Specific Processes

In step 116, the significant components are labeled to correspond to specific manufacturing processes based on a knowledge of the device physics and the manufacturing processes. In this example, the components are labeled as CDW ID (critical dimension of gate width effect on device drive current), CDW VT (critical dimension of gate width effect on device threshold voltage), CDL (critical dimension of gate length effect), implant dose effect, and gate oxide thickness effect. By examining the percentage of the original parameters accounted for by the device physics, five significant physical mechanisms are isolated in each of the eight-parameter transistor models. The two independent component analysis models for the n-channel and the p-channel data are then combined into a single 16-parameter independent component analysis model, and insignificant parameters are iteratively removed to generate a model having eight sources of variance, or components, that accounts for most of the variation of the original 16 parameters.

The percentage of variance of each parameter for each independent component in the estimated n-channel independent component analysis model for the cleaned data is illustrated in Table 6 below.

eight components are found that well represent the variation of the original 16 parameters. The variance accounted for in the resulting independent component analysis model is shown in Table 8 below.

TABLE 8

|        | IC1 CDL #1 | IC2 Implant N | IC3 Implant P | IC4 CDW VTN | IC5 CDW ID | IC6 CDW VTP | IC7 Gate Oxide | IC8 CDL #2 |
|--------|-----------|---------------|---------------|-------------|------------|-------------|----------------|------------|
| NLD    | 64.51 | 0.97          | 0.40          | 1.64        | 0.4        | 2.26        | 5.95           | 21.96  |
| IDN LW | 0.17      | 83.97     | 1.23          | 0.11        | 0.01       | 0.15        | 13.27      | 0.02       |
| IDN SW | 21.85 | 52.36     | 1.11          | 1.65        | 0.06       | 0.39        | 17.73      | 3.28       |
| IDN SN | 18.33 | 31.97     | 2.48          | 9.21        | 19.03  | 1.09        | 10.94      | 3.63       |
| VTN LW | 0.33      | 93.33     | 0.68          | 0.07        | 0.01       | 0.12        | 3.45           | 0.41       |
| VTN SW | 21.97 | 62.85     | 0.52          | 2.7         | 0.01       | 0.11        | 2.37           | 7.09       |
| VTN SN | 15.85 | 40.54     | 2.30          | 33.45   | 2.22       | 0.55        | 1.48           | 1.55       |
| TOX PW | 2.40      | 2.39          | 0.01          | 1.04        | 0.1        | 0.28        | 91.61      | 0.67       |
| PLD    | 89.98 | 0.53          | 2.36          | 0.2         | 0.01       | 0.24        | 0.56           | 2.83       |
| IDP LW | 1.94      | 0.89          | 7.46          | 0.35        | 0.72       | 2.28        | 83.59      | 0.81       |
| IDP SW | 39.59 | 0.12          | 15.40     | 2.93        | 0.85       | 0.65        | 18.7       | 18.71  |
| IDP SN | 19.89 | 0.21          | 6.27          | 4.65        | 45.07  | 4.53        | 16.08      | 2.29       |
| VTP LW | 2.53      | 0.18          | 29.31     | 0.32        | 2.12       | 6.66        | 55.94      | 0.22       |
| VTP SW | 26.15 | 0.01          | 28.28     | 0.24        | 2.72       | 4.59        | 14.65      | 19.12  |
| VTP SN | 9.66      | 0.03          | 1.09          | 0.29        | 4.33       | 59.81   | 8.05           | 16.49  |
| TOX NW | 2.45      | 2.62          | 0.05          | 1.1         | 0.07       | 0.28        | 92.0       | 0.49       |

TABLE 6

|        | IC1N CDW ID | IC2N CDL | IC3N Implant N | IC4N CDW VT | IC5N Gate Oxide |
|--------|-------------|----------|----------------|-------------|-----------------|
| NLD    | 0.84        | 90.66| 0.83           | 1.34        | 4.96            |
| IDN LW | 0.0         | 0.41     | 84.78      | 0.01        | 13.68       |
| IDN SW | 0.0         | 34.14| 47.01      | 0.04        | 16.78       |
| IDN SN | 23.71   | 33.3 | 30.72      | 2.56        | 9.64            |
| VTN LW | 0.07        | 1.07     | 93.77      | 0.0         | 3.51            |
| VTN SW | 0.01        | 38.87| 56.46      | 0.0         | 2.22            |
| VTN SN | 1.06        | 36.21| 38.56      | 22.85   | 1.29            |
| TOX PW | 0.02        | 1.55     | 1.99           | 0.76        | 95.53       |

The percentage of variance of each parameter for each independent component in the estimated p-channel independent component analysis model for the cleaned data is illustrated in Table 7 below.

TABLE 7

|        | IC1P CDW VT | IC2P CDW ID | IC3P Gate Oxide | IC4P Implant N | IC5P CDL |
|--------|-------------|-------------|-----------------|----------------|----------|
| PLD    | 0.76        | 0.96        | 0.48            | 10.42      | 85.54|
| IDP LW | 0.33        | 0.34        | 83.99       | 13.79      | 0.15     |
| IDP SW | 0.83        | 1.07        | 13.8        | 50.9       | 27.85|
| IDP SN | 3.95        | 46.35   | 12.6        | 20.0       | 17.01|
| VTP LW | 0.55        | 1.68        | 57.3        | 32.46      | 0.0      |
| VTP SW | 3.1         | 3.91        | 11.07       | 66.94      | 11.59|
| VTP SN | 67.09   | 2.26        | 8.06            | 20.2       | 2.32     |
| TOX NW | 0.34        | 0.03        | 94.64       | 1.68           | 1.31     |

The average percentage of variance for each of the estimated independent components IC1N, IC2N, IC3N, IC4N, IC5N, IC1P, IC2P, IC3P, IC4P, and IC5P is calculated by adding the percentage variance of each of the parameters in the first column of Table 1 and dividing by the number of parameters.

After combining the two independent component analysis models for the n-channel and the p-channel data into 16 components in the resulting independent component analysis model and iteratively removing insignificant components, Although five significant components were identified in each of the original n-channel and the p-channel separate models, the combined model for both the n-channel and the p-channel only includes eight components. The gate oxide components IC5N and IC3P for each of the n-channel and the p-channel devices in the separate models may be accounted for by the single component IC7 in the combined model, which follows from the fact that the gate oxide is grown for both devices at the same time. Likewise, the poly critical dimensions IC2N and IC5P for both the n-channel and the p-channel devices in the separate models may be accounted for by the single component IC1 in the combined model, because the poly gates are also patterned and etched at the same time in the manufacturing process.

The component IC8 is representative of an unexpected second n-type lateral diffusion mechanism that does not affect the n-channel saturation current or threshold voltage, but does affect the saturation current and the threshold voltage of the p-channel transistors. This phenomenon suggests that a diffused dopant is affecting the N+ region and the p-channel.

The components IC2 and IC3, which appear to explain the channel implant characteristics, remain distinct for each of the n-channel and the p-channel devices.

The component IC5 appears to account for the effect of narrow active saturation current for both the n-channel and the p-channel devices. It is believed that this effect is a result of defining the active areas of both the n-channel and the p-channel devices at the same time in the manufacturing process.

The components IC4 and IC6 appear to remain distinct for the n-channel and the p-channel devices, which implies an implant variation having similar effects on each device type from two separate implantation steps in the manufacturing process.

The results of averaging the percentages of variance of each parameter for each component in the example of Table 3 is illustrated in FIG. 2.

FIG. 2 illustrates a bar graph 200 of the average percentage of variance accounted for by each significant component in the combined independent component analysis model according to an embodiment of the present invention.

As may be appreciated from the bar graph 200, the gate oxide step accounts for 25 percent of the average parameter variance, indicating that the greatest improvement in yield may be realized by concentrating on control of the gate oxide manufacturing step to reduce the gate oxide parameter variation.

An important feature of the present invention is that no engineering knowledge or assumptions are placed on the initial independent component analysis model. The independent component analysis method isolates sources of variance blindly. The physical mechanisms are identified by examining how each component accounts for the variation in the original parameters. It is believed that the successful application of independent component analysis to semiconductor test data is due to the isolated and distinct effect of device physics phenomena on the device performance. For example, the lateral diffusion parameters NLD and PLD are not directly measurable from the E-test structures. Lateral diffusion is estimated by fitting the relationship of threshold voltage and saturation current across devices of various sizes. This method of isolating lateral diffusion is derived from the principles of semiconductor device physics. Independent component analysis, on the other hand, isolates the lateral diffusion mechanism based only on the statistics of the test parameters.

(7) Associate Physical Mechanisms with Process Steps

In step 118, the independent components representative of the significant sources of variance isolated by the independent component analysis model are examined to identify the corresponding physical mechanisms based on a knowledge of the physics of the test devices. For the n-channel devices, IC5N accounts for almost all of the gate oxide thickness (TOX-PW). IC5N accounts little for the threshold voltage and saturation current, because the n-channel devices are surface channel devices. Similarly, IC3P accounts for most of the gate oxide thickness (TOX-NW) variation of the p-channel devices and accounts much more for the p-channel threshold voltages and saturation currents, because the p-channel devices are buried channel devices.

IC2N and IC5P appear to have isolated the effect of the poly gate critical dimension on most of the lateral diffusion parameters and much of the short channel saturation currents and threshold voltages.

IC3N accounts for significant portions of the variation in threshold voltage and saturation current without accounting for the lateral diffusion or the gate oxide thickness parameters, suggesting that IC3N has isolated the effect of n-channel implants. Similarly, IC4P accounts for the effect of p-channel implants.

Finally, IC1N and IC4N appear to account for two separate narrow active physical mechanisms. IC4N appears to affect narrow saturation current, while IC1N appears to affect narrow threshold voltage. Neither IC1N or IC4N appear to affect wide active devices. It is expected that the narrow active device saturation current would be affected by an active critical dimension parameter. The second physical mechanism affecting narrow threshold voltage suggests that an additional phenomenon such as field edge profile or gate oxide thinning at the field edge may affect the threshold voltage. This result is an unexpected advantage, suggesting that not only did the independent component analysis isolate the expected physical mechanisms, but also that it may have isolated a separate, "hidden" mechanism that was not revealed in the test structures. Similarly, IC1P and IC2P isolate two narrow active mechanisms in the p-channel devices.

Step 120 is the exit point of the flow chart 100.

The repetition of steps 106 through 110 may be automated so that a user need only select parameters of interest and the selected minimum percentages of variance in a single parameter and in total variance.

The method of the present invention described above provides improved isolation of specific physical mechanisms in semiconductor E-test data compared to that provided by the test devices themselves. Further, the isolated components may be linked to specific sets of steps in the manufacturing process, enabling improvements in data mining, statistical process control, and problem diagnosis. Parametric data from a variety of other manufactured devices may also be used to practice various embodiments the present invention within the scope of the appended claims.

In other applications, the method of the present invention may be applied to "soft" E-test measurements, that is, the current volume of test structures and test measurements may be advantageously reduced by applying independent component analysis models to a limited set of easily measured, non-isolating parameters to provide the desired isolation of physical mechanisms. The result is similar to applying first principles of the device physics to calculate several signals from the same set of test structures, except that the independent component analysis model does not require knowledge of the first principles of the device physics, and the independent component analysis model can readily adapt to changes in the data. As a consequence, a significant cost savings in tester time and in silicon area required for the test structures may be realized.

In further applications, independent component analysis models may be used in the design of experiments (DOE). Experimental testing is costly, therefore various design of experiment models have been designed to glean more information from fewer test runs. These models usually require making broad assumptions that result in confounding several signals. Independent component analysis models may be used to isolate more signals with less information.

In still other applications, independent component analysis models may be used in real time process control to provide "soft sensor" signals. A combination of sensors is used in conjunction with many testing tools in an attempt to isolate the assortment of process phenomena occurring in the tool during operation. The sensors are chosen to isolate each physical mechanism, but the sensors are typically affected by several physical mechanisms at the same time. Independent component analysis models may provide better isolation of each physical mechanism and improve the tool's capability to adapt to changes in a process in real time.

The steps described above with regard to the flow chart 100 may also be implemented by instructions performed on a computer according to well-known programming techniques.

In another aspect of the present invention, a computer program product for isolating sources of variance in parametric data includes a medium for embodying a computer program for input to a computer and a computer program embodied in the medium for causing the computer to perform steps of:
  (a) cleaning a data set of measurements for a plurality of parameters;
  (b) generating a principal component analysis basis from the cleaned data set;
  (c) estimating an independent component analysis model from the principal component analysis basis;
  (d) calculating percentages of variance for the plurality of parameters explained by each component in the estimated independent component analysis model;

(e) if the calculated percentages of variance indicate that a component is a minor component, then transferring control to step (f), else transferring control to step (g);

(f) removing the minor component from the principal component analysis basis and transferring control to step (c); and (g) generating as output the estimated independent component analysis model wherein no component of the independent component analysis model is a minor component.

Although the method of the present invention illustrated by the flowchart descriptions above are described and shown with reference to specific steps performed in a specific order, these steps may be combined, sub-divided, or reordered without departing from the scope of the claims. Unless specifically indicated herein, the order and grouping of steps is not a limitation of the present invention.

While the invention herein disclosed has been described by means of specific embodiments and applications thereof, numerous modifications and variations could be made thereto by those skilled in the art without departing from the scope of the invention set forth in the following claims.

What is claimed is:

1. A method of isolating sources of variance in parametric data comprising steps of:
    receiving a data set of measurements for a plurality of physical parameters;
    cleaning the data set to remove measurements that may introduce error;
    generating a principal component analysis basis from the cleaned data set;
    estimating an independent component analysis model from the principal component analysis basis;
    calculating percentages of variance for the plurality of parameters explained by each component in the estimated independent component analysis model;
    removing a component from the principal component analysis basis when the calculated percentages of variance indicate that the component is a minor component; and
    generating as output the estimated independent component analysis model excluding the minor component; and
    identifying a physical mechanism corresponding to a significant component of the estimated independent component analysis model.

2. The method of claim 1, the calculated percentages of variance indicating that a component is a minor component when a percentage of variance for each of the plurality of parameters explained by the component is less than a minimum percentage of variance for a single parameter.

3. The method of claim 1, the calculated percentages of variance indicating that a component is a minor component when an average percentage of variance for the plurality of parameters explained by the component is less than a minimum average percentage of variance.

4. The method of claim 1 further comprising a step of calculating confidence intervals for rotation angles of the estimated independent component analysis model.

5. The method of claim 4 further comprising a step of labeling a component of the estimated independent component analysis model to correspond to a specific physical process.

6. The method of claim 5 further comprising a step of labeling the component as critical dimension of gate width effect on device drive current, critical dimension of gate width effect on device threshold voltage, critical dimension of gate length effect, implant dose effect, and gate oxide thickness effect.

7. The method of claim 5 further comprising a step of examining the labeled component to identify the corresponding physical mechanism associated with the specific physical process.

8. A computer readable storage medium tangibly embodying instructions for a computer that when executed by the computer implement a method for isolating sources of variance in parametric data, the method comprising steps of:
    receiving a data set of measurements for a plurality of physical parameters;
    cleaning the data set to remove measurements that may introduce error;
    generating a principal component analysis basis from the cleaned data set;
    estimating an independent component analysis model from the principal component analysis basis;
    calculating percentages of variance for the plurality of parameters explained by each component in the estimated independent component analysis model;
    removing a component from the principal component analysis basis when the calculated percentages of variance indicate that the component is a minor component; and
    generating as output the estimated independent component analysis model excluding the minor component; and
    identifying a physical mechanism corresponding to significant components of the estimated independent component analysis model.

9. The computer readable storage medium of claim 8, the calculated percentages of variance indicating that a component is a minor component when a percentage of variance for each of the plurality of parameters explained by the component is less than a minimum percentage of variance for a single parameter.

10. The computer readable storage medium of claim 8, the calculated percentages of variance indicating that a component is a minor component when an average percentage of variance for the plurality of parameters explained by the component is less than a minimum average percentage of variance.

11. The computer readable storage medium of claim 8 further comprising a step of calculating confidence intervals for rotation angles of the estimated independent component analysis model.

12. The computer readable storage medium of claim 11 further comprising a step of labeling a component of the estimated independent component analysis model to correspond to a specific physical process.

13. The computer readable storage medium of claim 12 further comprising a step of labeling the component as critical dimension of gate width effect on device drive current, critical dimension of gate width effect on device threshold voltage, critical dimension of gate length effect, implant dose effect, and gate oxide thickness effect.

14. The computer readable storage medium of claim 12 further comprising a step of examining the labeled component to identify the corresponding physical mechanism associated with the specific physical process.

* * * * *